United States Patent [19]

Mourier

[11] Patent Number: 4,661,852
[45] Date of Patent: Apr. 28, 1987

[54] OPTICAL-DIFFUSION CORRECTING DEVICE FOR A TELEVISION CAMERA TUBE

[75] Inventor: Christian Mourier, Le Chesnay, France

[73] Assignee: Thomson-CSF, Paris, France

[21] Appl. No.: 692,128

[22] Filed: Jan. 17, 1985

[30] Foreign Application Priority Data

Jan. 20, 1984 [FR] France ............................... 84 00888

[51] Int. Cl.⁴ .............................................. H04N 5/14
[52] U.S. Cl. ................................... 358/160; 358/209; 358/217
[58] Field of Search ............... 358/160, 217, 209, 162, 358/220, 222

[56] References Cited

U.S. PATENT DOCUMENTS 3,860,751 1/1975 Schneider ........................... 358/217
4,174,525 11/1979 Dechering et al. ................. 358/217
4,336,552 6/1982 Tanaka ........................... 358/162 X
4,476,494 10/1984 Tugayé .............................. 358/222

FOREIGN PATENT DOCUMENTS 2745102 4/1979 Fed. Rep. of Germany .
1208807 10/1970 United Kingdom .
2095958 10/1982 United Kingdom .

Primary Examiner—Michael A. Masinick
Assistant Examiner—E. Anne Toth
Attorney, Agent, or Firm—Oblon, Fisher, Spivak, McClelland & Maier

[57] ABSTRACT

Television camera lenses cover a field which is larger than the useful field to be televised. Defects appear in the useful image as a result of diffusion of light from the portion of the image which is not intended to be televised or in other words the peripheral portion. The device for correcting peripheral diffusion comprises scanning and processing means for scanning a band located on the target around the image to be televised and for supplying a diffusion-correcting signal which is representative of a mean value of the band-scanning signals.

5 Claims, 3 Drawing Figures

OPTICAL-DIFFUSION CORRECTING DEVICE FOR A TELEVISION CAMERA TUBE

BACKGROUND OF THE INVENTION

1. Field of the Invention

The present invention relates to an optical-diffusion correcting device for a television camera tube and more particularly to a device for correcting diffusion effects of the periphery.

2. Description of the Prior Art

Since television camera lenses cover a field which is larger than the field of the useful image or image to be televised, it is known that defects appear as a result of diffusion of light rays in that portion of the image which is supplied by the camera lens and which surrounds the useful image. This phenomenon of diffusion of the periphery in the useful image is also known as peripheral diffusion. In point of fact, the correcting devices which continuously measure the mean content of the useful image and apply a fraction of this value as a correction in the video signal transmission channel are not capable of detecting and therefore correcting peripheral diffusion defects in the useful image.

It has been sought to remedy the above-mentioned diffusion defects at the periphery of the useful image. Thus a known method consists in placing a mask provided with a window in front of the scanning tube target. The unwanted portion of the image supplied by the camera lens to the scanning tube target can therefore be theoretically eliminated. In practice, however, the design of the scanning tube makes it impossible to place the mask immediately against the target since a glass pastille a few millimeters in thickness is placed in front of the target on the tube faceplate in order to prevent the halos which would be produced by any parasitic reflections in the faceplate. As a result of said pastille, the distance between the mask and the focal plane of the camera lens or in other words the target plane makes it necessary to enlarge the window of the mask in order to ensure that no shadow is produced on the edges of the useful image. The mask is therefore of limited effectiveness since the target receives part of the unwanted image.

SUMMARY OF THE INVENTION

The aim of the invention is to overcome the disadvantages mentioned in the foregoing or at least to reduce them to a very appreciable extent.

This result is obtained by taking into account, in the signal generated by the electronic device for correcting optical diffusion, that portion of the image which is supplied to the scanning tube target by the television camera lens and which surrounds the useful image.

According to the invention, there is provided an optical-diffusion correcting device for a television camera tube in which the camera has a lens for supplying an image and the tube has a video output and a target for receiving the image and producing video signals. Said device comprises an adding circuit for receiving the video signals and diffusion correcting signals, and peripheral-diffusion correcting means for scanning a closed band which forms part of the image supplied by the camera lens and surrounds on the target the useful image to be televised and for delivering to the adding circuit a diffusion-correcting signal which is representative of a mean value of the closed-band scanning signals.

BRIEF DESCRIPTION OF THE DRAWINGS

Other features of the invention will be more apparent upon consideration of the following description and accompanying drawings, wherein.

In the figures, corresponding elements are designated by the same references.

DESCRIPTION OF THE PREFERRED EMBODIMENTS

Figure 1:
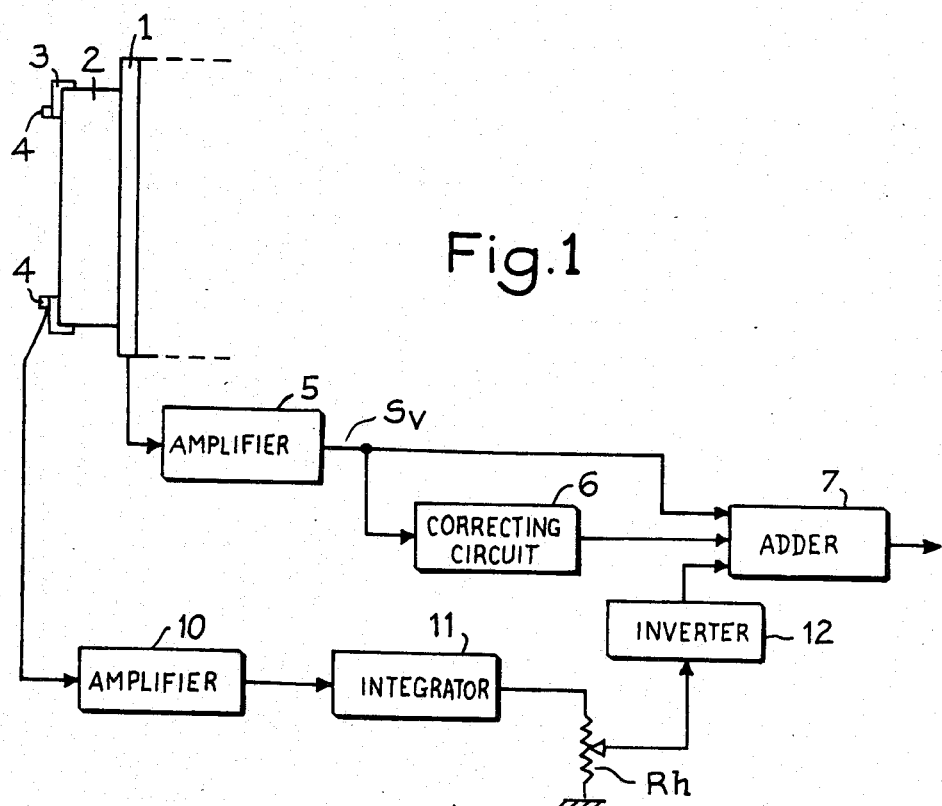
FIG. 1 illustrates a first example of construction of a device in accordance with the invention.

FIG. 1 is a schematic representation of the front end 1, 2 of a modern scanning tube provided with a lead-monoxide photoconductive target 1 covered by an anti-halo glass pastille 2. Said tube is covered by a mask 3 pierced with a rectangular window. The tube of FIG. 1 (which is similar to the tube described hereinafter with respect to FIG. 3) has a diameter of one inch (25.4 mm), is provided with a target having a diameter of 20.6 millimeters, and is covered by a mask in which is formed a window measuring 11×14 millimeters.

A frame 4 placed around the entire edge of the window of the mask 3 of FIG. 1 is formed by an array of CCD (charge-coupled device) sensors and provided with its own scanning circuit which is independent of the scanning tube circuit. The frame is placed at a location in which it is sensitive to the light rays received by a closed band which surrounds the useful image. The term *useful image*, as used above and throughout the following description, is understood to mean that portion of the image which is provided by the camera lens and subsequently televised. An amplifier 10 receives the signals from the frame 4 and, after amplification, applies said signals to the input of an integrator 11 which provides a mean value of these latter. A potentiometer Rh receives the output signal of the integrator 11 and applies an adjustable fraction of said signal via an inverter 12 to the third input of an adder 7. Except for the fact that it has three inputs instead of two, said adder 7 forms part of a conventional diffusion-correcting device which comprises, upstream of the adder, an amplifier 5 and a conventional correcting circuit 6. The amplifier 5 is connected to the target 1 of the tube in order to deliver an amplified video signal Sv to the first input of the adder and to the input of the correcting circuit 6, the output of which is connected to the second input of the adder 7. The correcting circuit 6 measures the mean value of the content of each field of the image and applies a fraction of this value, which is subtracted from the video signal Sv by means of an output inverter, to the second input of the adder.

The correction made by the elements 4, 10, 11, Rh, 12 of FIG. 1 for the diffusion effects produced by the periphery of the useful image has been tested under laboratory conditions and has given satisfactory results. At the present time, however, this solution involves high capital cost on account of the array of sensors 4. Another solution which has been tested experimentally leads to the same quality of correction while being distinctly less costly. And it is this solution which will now be described with reference to FIGS. 2 and 3.

In the correcting device described with reference to FIGS. 2 and 3, the correcting signal is obtained by using the target 1 of the tube as a means for picking-up signals which, after processing, will serve to make a correction for peripheral diffusion. To this end, it is proposed to modify the sweep within the camera tube in order to extend the scanned area to the shadow region formed by the mask or to a closed band surrounding the useful image in the event that a mask is not employed.

Figure 2:
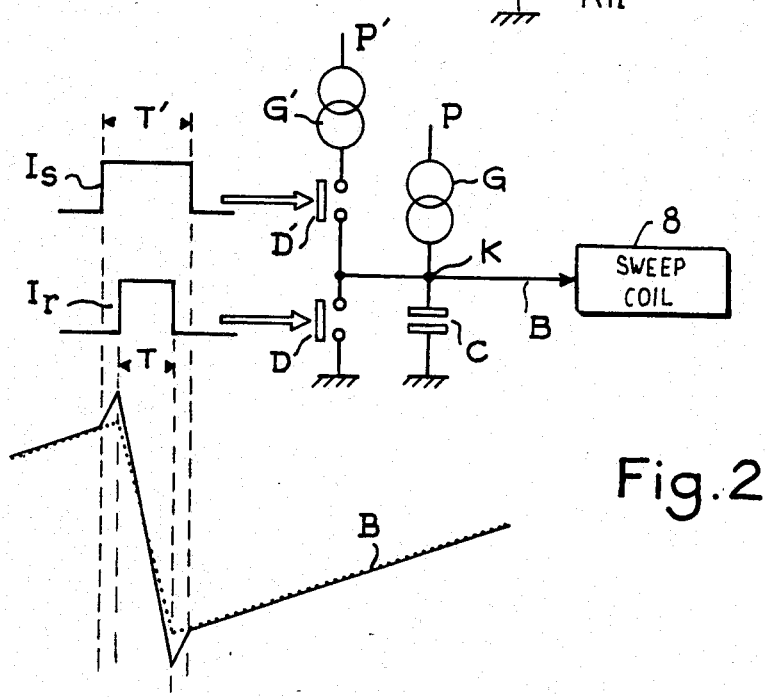
FIGS. 2 and 3 illustrate two portions of a second example of construction of a device in accordance with the invention.

FIG. 2 shows the method adopted for modifying the camera-tube sweep. A current generator G is connected between a potential node P and a terminal K. A capacitor C and an electronic switch D represented schematically by a simple mechanical switch are connected between the terminal K and ground. The elements G, C, D which are mounted as shown in the figure constitute a conventional sawtooth signal generator. The switch D is controlled by pulses Ir having a time-duration T and the signal generator constituted by the elements G, C, D delivers to a sweep coil 8 a sweep signal B which is shown as a dotted line in FIG. 2. In the case of the line sawtooth generator, the pulses Ir are line retrace pulses (of 9 μs duration in the example described), and, in the case of the field sawtooth generator, the field retrace pulses (of 400 μs duration in the example described). The sawtooth generator of FIG. 2 is distinguished from a conventional generator by the fact that a second electronic switch D' and a second current generator G' mounted in series are added between the terminal K and a node at a potential P' which is higher than P. The switch D' is controlled by pulses Is having a duration T' which is longer than the line (or field) retrace interval T and equal at a maximum to the final blanking interval (12 μs in the case of line blanking and 1.2 ms in the case of field blanking). In the example herein described, the field-frequency pulses Is are of 1 ms duration and the line-frequency pulses Is are of 11 μs duration. The output signal B of the sweep generator constituted by the elements G, G', C, D, D' has the signal waveform shown in FIG. 2 and represented by a full line.

Figure 3:
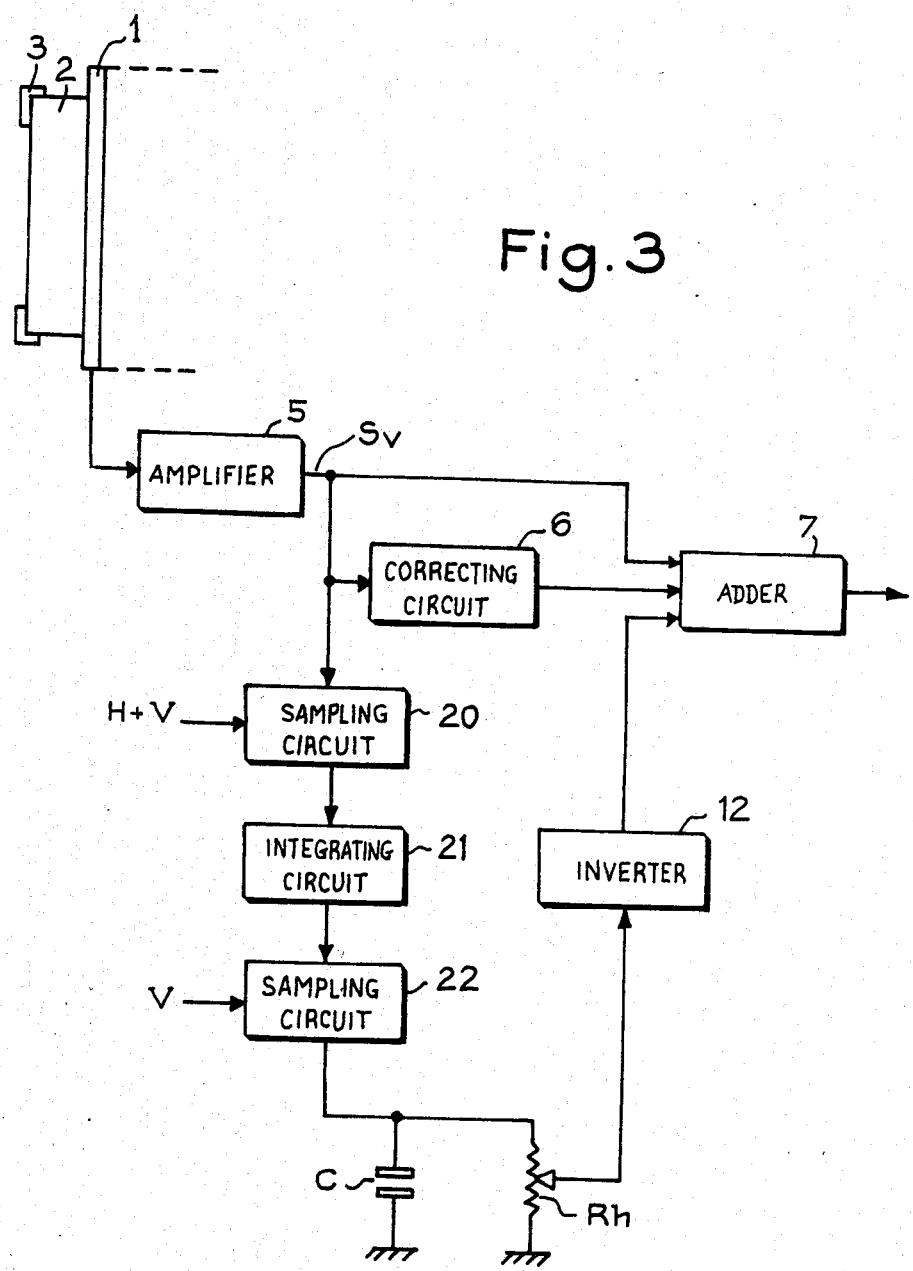

FIG. 3 shows a scanning tube together with its target 1, its anti-halo glass pastille 2 and its mask 3. Scanning is controlled within this tube by a generator in accordance with FIG. 2. As in the case of the tube shown in FIG. 1, the target is connected to an amplifier 5, the output of which is connected directly to the first input of an adder 7 and to the second input of said adder via a conventional correction circuit 6.

In comparison with a conventional correction device, the device of FIG. 3 comprises an adder 7 having three inputs instead of two. In addition, said correction device is provided between the output of the amplifier 5 and the third input of the adder 7 with an assembly of circuits for correcting the diffusion effects produced by the periphery of the useful image. This additional assembly comprises a sampling circuit 20, the input signal of which is constituted by the amplified video signal Sv delivered by the amplifier 5, an integrating circuit 21 whose input is connected to the output of the sampling circuit 20, a sampling circuit 22 whose signal input is connected to the output of the integrating circuit 21, a capacitor C connected between the output of the sampling circuit 22 and ground, a potentiometer Rh whose ends are connected respectively to the output of the sampling circuit 22 and to ground, and an inverter 12 whose input is connected to the sliding contact of the potentiometer Rh and whose output is connected to the third input of the adder 7.

The sampling circuit 20 of FIG. 3 is in the conducting state during the pulse-width time interval of the sampling pulses H+V applied to the control input of said sampling circuit. Said pulses H+V are constituted by all the pulses Is already mentioned in the description of FIG. 2, that is to say both the line-frequency pulses Is of the line sweep generator and the field-frequency pulses Is of the field sweep generator. The sampling circuit 20 thus makes it possible to collect the video signals corresponding to the peripheral light rays of the useful image in the image supplied to the target 1 by the camera lens.

The integrating circuit 21 of FIG. 3 supplies the mean value of the signal sampled by the sampling circuit 20. In order to avoid variations in the peripheral-diffusion correcting signal during a field scan, said mean value is sampled within the sampling circuit 22 at the field frequency by means of the signal V formed by the pulses Is of the field sweep generator. The signal obtained is stored within the capacitor C during one field scan. After inversion in the inverter 12, an adjustable fraction of the stored value is added to the video signal Sv and to the main correcting signal (output of the correction circuit 6) during the following field scan.

The correction for peripheral diffusion as performed in accordance with the diagrams of FIGS. 2 and 3 and the relevant description is practically perfect. Corrections which are less perfect but easier to apply to existing equipment can also be devised within the scope of the invention. For example, without modifying the sweep waveforms and the beam-blanking periods, that is to say in particular by making use of conventional sweep circuits, a region having a relatively small area is scanned outside the useful image. This region corresponds to the time intervals located between the blanking periods (9 μs between lines and 400 ms between fields) and final blanking (12 μs between lines and 1.2 ms between fields). Correction can therefore be performed by sampling the signals relating to this region as in the case of FIG. 3.

It should also be mentioned that correction for peripheral diffusion can be made by eliminating the circuits 21 and 22 in the diagram of FIG. 3 and replacing them by a direct connection between the sampling circuit 20 and the common node between the capacitor C and the potentiometer Rh. The output signal of the sampling circuit 20 is stored within the capacitor C without preliminary processing. This results in a slight variation in the black level during a field scan but tests have shown that the quality of the image is distinctly improved in comparison with the results obtained without correction for peripheral diffusion.

It will further be noted that, in a color television camera, a peripheral-diffusion correcting device in accordance with the invention may be applied to only one tube (usually the red tube) or to both tubes or to all three tubes.

Another point worthy of note is that the embodiments discussed in the foregoing related to peripheral-diffusion corrections in which a single signal per field is produced for correcting the video signals of the following field. It would also be possible, although at higher cost, to generate together with the signals for scanning the periphery of the useful image a number of signals corresponding to the number of scanning lines in one field. It would also be possible to subdivide the scanning region and thus to make more localized corrections than in the case of a single uniform signal applied for correction of an entire field as in the examples hereinabove described.

What is claimed is:

1. An optical-duffison correcting device for a television camera tube in which the camera has a lens for supplying an image and the tube has a video output and a target for receiving the image and producing video signals, said device comprising along with a first diffusion correcting signal an adding circuit for receiving the video and first diffusion correcting signals, and peripheral-diffusion correcting mean for scanning a closed band which forms part of the image supplied by the camera lens and surrounds on the target a useful image to be televised and for delivering to the adding circuit a second diffusion-correcting signal which is representative of a means value of a signal obtained by scanning of the closed-band.

2. A correcting device according to claim 1 for a television camera tube provided on its front face with a mask in which is pierced a window, wherein the peripheral-diffusion correcting means comprise a frame formed of photosensitive elements placed on the mask around the window, an amplifying circuit coupled to the photosensitive elements and an integrating circuit having one input coupled to said amplifying circuit and one output coupled to the adding circuit.

3. A correcting device according to claim 1, wherein the peripheral-diffusion correcting means comprise a sampling circuit coupled to the video output of the tube in order to make a selection of the video signals corresponding to the closed band by means of sampling control signals constituted by line-frequency pulses having a time-duration which is longer than the line retrace interval and equal at a maximum to the final line-blanking interval of the useful image and by field frequency pulses having a time-duration which is longer than the field-retrace interval and equal at a maximum to the final field-blanking interval of the useful image, and a storage circuit having one input coupled to the sampling circuit and one output coupled to the adding circuit.

4. A correcting device according to claim 3, wherein the sampling circuit is coupled to the storage circuit by means of an integrating circuit followed by another sampling circuit in which the sampling control signals are constituted by field-frequency pulses having a time-duration which is equal at a maximum to the final field-blanking interval of the useful image.

5. A correcting device according to claim 1 for a television camera tube in which the camera comprises a conventional tube sweep circuit, wherein the peripheral-diffusion correcting means comprise a complexentary circuit coupled to the conventional sweep circuit of the tube in order to extend the camera-tube sweep to the entire closed band.

* * * * *